United States Patent
Satoh et al.

(10) Patent No.: US 6,911,497 B2
(45) Date of Patent: Jun. 28, 2005

(54) POLYPROPYLENE RESIN COMPOSITION, METHOD FOR ITS PRODUCTION, AND INJECTION MOLDED ARTICLE

(75) Inventors: Jun Satoh, Chiba (JP); Hiroyuki Tanimura, Sodegaura (JP); Katsuyuki Imigi, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/806,154

(22) Filed: Mar. 23, 2004

(65) Prior Publication Data

US 2004/0242773 A1 Dec. 2, 2004

(30) Foreign Application Priority Data

Mar. 27, 2003 (JP) ........................................ 2003-088115

(51) Int. Cl.$^7$ ................................................ C08L 53/00
(52) U.S. Cl. ...................................... 525/192; 525/194
(58) Field of Search .................................. 525/192, 194

(56) References Cited

U.S. PATENT DOCUMENTS

| | | | | |
|---|---|---|---|---|
| 4,626,565 A | | 12/1986 | Kawai et al. | |
| 5,449,738 A | * | 9/1995 | Koura et al. | 525/247 |
| 5,473,021 A | * | 12/1995 | Koura et al. | 525/247 |
| 5,747,576 A | * | 5/1998 | Sobajima et al. | 524/451 |
| 5,990,220 A | * | 11/1999 | Sobajima et al. | 524/449 |
| 6,087,443 A | | 7/2000 | Sadatoshi et al. | |
| 6,284,355 B1 | * | 9/2001 | Nagata et al. | 428/213 |
| 6,326,434 B1 | * | 12/2001 | Lee et al. | 525/194 |
| 6,608,130 B1 | * | 8/2003 | Zanka et al. | 524/451 |
| 6,635,705 B2 | * | 10/2003 | Itoh et al. | 524/525 |

FOREIGN PATENT DOCUMENTS

JP         08-283487 A        10/1996

* cited by examiner

Primary Examiner—Jeffrey Mullis
(74) Attorney, Agent, or Firm—Sughrue Mion, PLLC

(57) ABSTRACT

A polypropylene resin composition having a melt flow rate of 70 to 120 g/10 min (at 230° C., 2.16 kgf-load), a flexural modulus of 1300 to 4000 MPa and an IZOD impact strength of 30 to 100 kJ/m$^2$, wherein the composition is obtained by adding a small amount of an organic peroxide to a mixture comprising 60 to 80% by weight of a specific propylene-ethylene block copolymer made up of a propylene homopolymer portion and a propylene-ethylene random copolymer portion, a rubber which is a copolymer of ethylene and at least one α-olefin having a melt flow rate of 2 to 10 g/10 min (at 190° C., 2.16 kgf-load), and inorganic filler (C), and kneading the combined ingredients at a temperature of 170 to 280° C.

3 Claims, No Drawings

POLYPROPYLENE RESIN COMPOSITION, METHOD FOR ITS PRODUCTION, AND INJECTION MOLDED ARTICLE

BACKGROUND OF THE INVENTION

1. Field of the Invention

The present invention relates to a polypropylene resin composition and its injection molded article. More particularly, the invention relates to a polypropylene resin composition characterized by being obtained by use of a small amount of organic peroxide, by exhibiting a high fluidity, and by being capable of yielding therefrom an injection molded article superior in heat distortion resistance, hardness and balance between rigidity and impact strength, to a method for its production, and to its injection molded article.

2. Description of the Related Art

Polypropylene resin compositions have heretofore been employed for the production of injection molded articles. For example, U.S. Pat. No. 4,626,565 discloses, as a method for producing a polypropylene resin composition which is superior in low-temperature impact resistance, fluidity and paintability and which is inexpensive, a method comprising heat treating, at a temperature of 170 to 280° C., a composition comprising a crystalline ethylene-propylene block copolymer, an ethylene-propylene copolymer rubber, inorganic filler and an organic peroxide wherein the amount of the organic peroxide is 0.001 to 0.5 part by weight per 100 parts by weight of the block copolymer and the copolymer rubber in total.

Japanese Patent Laid-Open No. 8-283487 discloses, as a polypropylene resin composition which is superior in low-temperature resistance while having an extremely high MFR (80 g/10 min or more) and which is superior in impact resistance and strength while having a high rigidity and a high heat resistance, a polypropylene resin composition containing a polypropylene resin having an MFR of 150 to 1000 g/10 min and a copolymer having a portion made up of ethylene and α-olefin wherein the composition has an MFR of 80 g/10 min. It discloses also that a peroxide or inorganic filler may also be blended if needed.

U.S. Pat. No. 6,087,443 discloses a thermoplastic resin composition improved in low-temperature impact resistance and thermal rigidity resistance, which is a thermoplastic resin composition obtained by mixing a propylene homopolymer and/or an ethylene-propylene block copolymer with a heat-treated material resulting from a dynamic heat treatment of a mixture of a propylene homopolymer and/or an ethylene-propylene block copolymer having a melt flow rate of 0.5 to 10 g/10 min and an olefinic copolymer in the presence of an organic peroxide and a crosslinking aid.

However, the polypropylene resin compositions and their production methods disclosed in the patent publications shown above need a reduction in the quantity of the organic peroxide to be used. In addition, there is a request for further improvements in fluidity of polypropylene resin compositions and in heat distortion resistance, hardness and balance between rigidity and impact strength of injection molded articles.

SUMMARY OF THE INVENTION

The object of the present invention is to provide a polypropylene resin composition characterized by being obtained by use of a small amount of organic peroxide, by exhibiting a high fluidity, and by being capable of yielding therefrom an injection molded article superior in a balance between rigidity and impact strength and also superior in heat distortion resistance and hardness and to provide a method for its production. Moreover, the present invention provides an injection molded article superior in a balance between rigidity and impact resistance and also superior in heat distortion resistance and hardness.

Considering such situations, the present inventors studied diligently to accomplish the present invention.

An aspect of the present invention relates to a polypropylene resin composition having a melt flow rate, measured at 230° C. under a load of 2.16 kgf, of 70 to 120 g/10 min, a flexural modulus of 1300 to 4000 MPa and an IZOD impact strength of 30 to 100 kJ/m$^2$, wherein the composition is obtained by adding 0.01 to 0.04 part by weight of an organic peroxide (D) to 100 parts by weight of a mixture comprising 60 to 80% by weight of a propylene-ethylene block copolymer (A) which is made up of a propylene homopolymer portion and a propylene-ethylene random copolymer portion and which satisfies requirements (A-1) through (A-5) defined below, 10 to 30% by weight of a rubber (B) which is a copolymer made up of ethylene and at least one α-olefin selected from the group consisting of 1-butene, 1-hexene and 1-octene and which has a melt flow rate, measured at 190° C. under a load of 2.16 kgf, of 2 to 10 g/10 min, and 5 to 20 parts by weight of inorganic filler (C), and kneading the combined ingredients at a temperature of 170 to 280° C., provided that each of the quantities of the propylene-ethylene block copolymer (A), the rubber (B) and the inorganic filler (C) is based on the total weight of these three ingredients:

requirement (A-1): the propylene-ethylene block copolymer has a melt flow rate, measured at 230° C. under a load of 2.16 kgf, of 100 to 140 g/10 min;

requirement (A-2): the propylene-ethylene random copolymer portion has an intrinsic viscosity of 3 to 5 dl/g;

requirement (A-3): the propylene-ethylene random copolymer portion has an ethylene content of 20 to 60% by weight;

requirement (A-4): the content of the propylene-ethylene random copolymer portion is 5 to 15% by weight; and requirement (A-5): the ethylene content of the propylene-ethylene block copolymer is 3 to 6.5% by weight.

Another aspect of the present invention relates to a method for producing a polypropylene resin composition having a melt flow rate, measured at 230° C. under a load of 2.16 kgf, of 70 to 120 g/10 min, a flexural modulus of 1300 to 4000 MPa and an IZOD impact strength of 30 to 100 kJ/m$^2$, wherein the method comprises adding 0.01 to 0.04 part by weight of an organic peroxide (D) to 100 parts by weight of a mixture comprising 60 to 80% by weight of a propylene-ethylene block copolymer (A) which is made up of a propylene homopolymer portion and a propylene-ethylene random copolymer portion and which satisfies requirements (A-1) through (A-5) defined below, 10 to 30% by weight of a rubber (B) which is a copolymer made up of ethylene and at least one α-olefin selected from the group consisting of 1-butene, 1-hexene and 1-octene and which has a melt flow rate, measured at 190° C. under a load of 2.16 kgf, of 2 to 10 g/10 min, and 5 to 20 parts by weight of inorganic filler (C), and kneading the combined ingredients at a temperature of 170 to 280° C. to form a polypropylene resin composition, provided that each of the quantities of the propylene-ethylene block copolymer (A), the rubber (B) and the inorganic filler (C) is based on the total weight of these three ingredients:

requirement (A-1): the propylene-ethylene block copolymer has a melt flow rate, measured at 230° C. under a load of 2.16 kgf, of 100 to 140 g/10 min;

requirement (A-2): the propylene-ethylene random copolymer portion has an intrinsic viscosity of 3 to 5 dl/g;

requirement (A-3): the propylene-ethylene random copolymer portion has an ethylene content of 20 to 60% by weight;

requirement (A-4): the content of the propylene-ethylene random copolymer portion is 5 to 15% by weight; and requirement (A-5): the ethylene content of the propylene-ethylene block copolymer is 3 to 6.5% by weight.

Another aspect of the present invention relates to an injection molded article obtained by injection molding the above-mentioned polypropylene resin composition.

DESCRIPTION OF THE PREFERRED EMBODIMENTS

The propylene-ethylene block copolymer (A) in the present invention is a copolymer which is made up of a propylene homopolymer portion and a propylene-ethylene random copolymer portion.

The proportion of the propylene-ethylene random copolymer portion in the propylene-ethylene block copolymer (A) is 5 to 15% by weight (requirement (A-1)), and preferably 8 to 13% by weight.

If the content of the random copolymer portion is less than 5% by weight, a resulting composition or its molded article may have a low impact strength. If the content exceeds 15% by weight, a resulting composition or its molded article may have a low flexural modulus.

The ethylene content of the random copolymer portion in the block copolymer (A), $(C2')_{EP}$, is 20 to 60% by weight (requirement (A-3)), and preferably 20 to 40% by weight.

If the ethylene content $(C2')_{EP}$ of the random copolymer portion is less than 20% by weight, a resulting composition or its molded article may have a low impact strength. If the ethylene content exceeds 60% by weight, a resulting composition or its molded article may have a low flexural modulus.

The intrinsic viscosity of the random copolymer portion in the block copolymer (A), $[\eta]_{EP}$, is 3 to 5 dl/g (requirement (A-2)), and preferably 3.5 to 4.5 dl/g.

If the intrinsic viscosity of the random copolymer portion, $[\eta]_{EP}$, is less than 3 dl/g, a resulting composition or its molded article may have a low impact strength. If the intrinsic viscosity exceeds 5 dl/g, a resulting composition or its molded article may have a low flexural modulus.

The melt flow rate (MFR, measured at 230° C. under a load of 2.16 kgf) of the block copolymer (A) is 100 to 140 g/10 min (requirement (A-1)), and preferably 110 to 130 g/10 min.

If the melt flow rate of the block copolymer (A) is less than 100 g/10 min, a resulting composition may have a low fluidity. If the melt flow rate exceeds 140 g/10 min, a resulting composition may have a too high fluidity and also the composition and its molded article may have an insufficient impact strength.

The ethylene content of the block copolymer (A) is 3 to 6.5% by weight (requirement A5)), preferably 5 to 6.5% by weight, and more preferably 5 to 6.0% by weight.

If the ethylene content of the block copolymer (A) is less than 3% by weight, a resulting composition or its molded article may have a low impact strength. If the ethylene content exceeds 6.5% by weight, a resulting composition or its molded article may have a low flexural modulus.

The method for producing the block copolymer (A) may be a method in which the propylene homopolymer portion is produced in a first stage and the propylene-ethylene random copolymer portion is produced in a second stage. The propylene homopolymer portion may be produced either in a single stage or in two or more stages. The propylene-ethylene random copolymer portion may also be produced either in a single stage or in two or more stages.

The copolymer can be produced by a method by a known polymerization technique using a known polymerization catalyst. Examples of the known polymerization catalyst include Ziegler-Natta catalyst and metallocene catalysts. Examples of the known polymerization technique include slurry polymerization and gas phase polymerization. Concretely, the block copolymer (A) for use in the present invention can be produced, for example, by the methods disclosed in U.S. Pat. Nos. 5,449,738 and 5,473,021, the disclosures of which are incorporated herein by reference for the description of the preparation of the block copolymer (A).

The rubber (B) used in the present invention, which is a copolymer made up of ethylene and at least one α-olefin selected from the group consisting of 1-butene, 1-hexene and 1-octene, has a melt flow rate (MFR, measured at 190° C. under a load of 2.16 kgf) of 2 to 10 g/10 min, and preferably 4 to 8 g/10 min.

If the melt flow rate of the rubber (B) is less than 2 g/10 min, a resulting composition may have a low fluidity and also may have a low flexural modulus. The melt flow rate exceeds 10 g/10 min, a resulting composition or its molded article may have a low impact strength.

The density of the rubber (B) is generally less than 0.9 g/cm$^3$, and preferably 0.89 g/cm$^3$ from the viewpoint of the impact strength of a resulting composition or its molded article and the dispersibility of the rubber in the block copolymer (A).

The rubber (B) can be produced, for example, by polymerization conducted in an inert organic solvent such as hydrocarbon compounds using a Ziegler-Natta catalyst system comprising a vanadium compound, an organoaluminum compound and a halogenated ester compound or a so-called metallocene catalyst system, which comprises a combination of alumoxane or a boron compound with a metallocene compound composed of a titanium, zirconium or hafnium atom to which at least one group having a cyclopentadienyl anion skeleton is coordinated.

Examples of the inorganic filler (C) for use in the present invention include talc, mica, wollastonite, calcium carbonate, barium sulfate, magnesium carbonate, clay, alumina, silica, calcium sulfate, magnesium sulfate, carbon fiber, glass fiber, metal fiber, quartz sand, carbon black, titanium oxide, magnesium hydroxide, zeolite, molybdenum compounds, silicious marl, sericite, shirasu, calcium hydroxide, calcium sulfite, sodium sulfate, bentonite and graphite. Talc is preferred from the viewpoints of impact strength of a resulting composition or its molded article and impartation of luster or good external appearance to molded articles.

The average particle diameter of the inorganic filler (C) is generally from 0.1 to 100 μm, and preferably from 0.5 to 50 μm.

The average particle diameter of talc is generally from 0.1 μm to 10 μm or less, and preferably from 0.5 μm to 5 μm or less. The average particle diameter of talc denotes a 50% equivalent particle size D50 determined from an integrated distribution curve by a minus sieve method made by suspending talc in a dispersion medium such as water and alcohol using a centrifugal sedimentation type particle size distribution measuring apparatus.

Talc may be surface treated before use with a silane coupling agent, a titanium coupling agent or a surfactant for the purpose of improving its interfacial adhesiveness with a polypropylene resin and improving its dispersibility in the polypropylene resin. Examples of the surfactant include higher fatty acids, higher fatty acid esters, higher fatty acid amides, and higher fatty acid salts.

The contents of the block copolymer (A), the rubber (B) and the inorganic filler (C) in the mixture containing these ingredients for use in the present invention are the block copolymer (A): 60 to 80% by weight; the rubber (B): 10 to 30% by weight; and the inorganic filler (C): 5 to 20% by weight. All the above-mentioned contents of the block copolymer (A), the rubber (B) and the inorganic filler (C) are based on the combined weight of the ingredients (A), (B) and (C).

The contents of the block copolymer (A), the rubber (B) and the inorganic filler (C) are preferably 60 to 80% by weight, 10 to 30% by weight and 5 to 20% by weight, respectively.

If the content of the block copolymer (A) is less than 60% by weight, a resulting composition may have a low fluidity and also may have a low flexural modulus. If the content exceeds 80% by weight, a resulting composition or its molded article may have a low impact strength.

If the content of the rubber (B) is less than 10% by weight, a resulting composition or its molded article may have a low impact strength. If the content exceeds 30% by weight, a resulting composition may have a low fluidity and also the composition or its molded article may have a low flexural modulus.

If the content of the inorganic filler (C) is less than 5% by weight, a composition or its molded article may have a low flexural modulus. If the content exceeds 20% by weight, a resulting composition or its molded article may have a low impact strength.

Examples of the organic peroxide (D) for use in the present invention include 2,5-dimethyl-2,5-di(t-butylperoxy)hexane, 2,5-dimethyl-2,5-di(t-butylperoxy)hexyne-3, 1,3-bis(t-butylperoxyisopropyl)benzene, 1,1-di(t-butylperoxy)-3,5,5-trimethylcyclohexane, 2,5-dimethyl-2,5-di(peroxybenzoyl)hexyne-3 and dicumyl peroxide. Preferred is 2,5-dimethyl-2,5-di(t-butylperoxy)hexane.

The incorporation amount of the organic peroxide (D) is 0.01 to 0.04 part by weight, and preferably 0.01 to 0.03 part by weight based on 100 parts by weight of the mixture of the block copolymer (A), the rubber (B) and the inorganic filler (C).

If the incorporation amount of the organic peroxide (D) is less than 0.01 part by weight, a resulting composition may have a low fluidity. If the amount exceeds 0.04 part by weight, a resulting composition or its molded article may have a low flexural modulus.

The polypropylene resin composition of the present invention is a polypropylene resin composition obtained by adding 0.01 to 0.04 part by weight of the organic peroxide (D) to 100 parts by weight of a mixture comprising the block copolymer (A), the rubber (B) and the inorganic filler (C) and kneading the combined ingredients at a temperature of 170 to 280° C. The kneading temperature is preferably from 180 to 250° C.

If the kneading is conducted at a temperature lower than 170° C., mixing may be done insufficiently due to a low fluidity of the materials to be kneaded. If the kneading temperature exceeds 280° C., the ingredients of the composition may decompose.

The polypropylene resin composition of the present invention is produced by a method in which ingredients are mixed and kneaded while being heated. Examples of the device to be used for the kneading include a single screw extruder, a twin screw extruder, a Banbury mixer and hot rolls. The kneading time is generally 1 to 20 minutes. The mixing of the ingredients may be carried out simultaneously or stepwise.

When the ingredients are mixed stepwise, they may be mixed in any method of the following (1) to (5):

(1) a method in which the block copolymer (A) and the inorganic filler (C) are mixed and then the rubber (B) is added;

(2) a method in which a master batch is prepared by kneading part of the block copolymer (A) with the inorganic filler (C) in a high content and then the master batch is kneaded while being diluted with another part of the block copolymer (A) and the rubber (B);

(3) a method in which the block copolymer (A) and the rubber (B) and then the inorganic filler (C) is added;

(4) a method in which a master batch is prepared by kneading the rubber (B) with part of the block copolymer (A) and then another part of the block copolymer (A) and the inorganic filler (C) are added thereto and kneaded; and (5) a method in which part of the block copolymer (A) and the inorganic filler (C) and, separately, another part of the block copolymer (A) and the rubber (B) are kneaded, respectively, and then both kneaded materials are combined and further kneaded.

The polypropylene resin composition of the present invention has a melt flow rate, measured at 230° C. under a load of 2.16 kgf, of 70 to 120 g/10 min, and preferably 70 to 100 g/10 min.

If the melt flow rate of the polypropylene resin composition is less than 70 g/10 min, an insufficient filling of the composition may occur during its molding due to its low fluidity. If the melt flow rate exceeds 120 g/10 min, defects such as flash may occur during its molding.

The flexural modulus in the present invention is measured by the method provided in ASTM D790. The measurement is carried out under the conditions shown below by use of a 3.2 mm thick specimen prepared by injection molding: span length: 50 mm; load speed: 2 mm/min; and measuring temperature: 23° C.

The flexural modulus of the polypropylene resin composition of the present invention is 1300 to 4000 MPa, preferably 1350 to 3000 MPa and more preferably 1400 to 2000 MPa.

If the flexural modulus of the polypropylene resin composition is less than 1300 MPa, a resulting molded article may have an insufficient rigidity. If exceeding 4000 MPa, a resulting molded article may be brittle.

The IZOD impact strength in the present invention is measured by the method provided in ASTM D256. The measurement is carried out using a 3.2-mm thick, notched specimen prepared by injection molding followed by notching. The measuring temperature is 23° C. and −30° C.

The IZOD impact strength of the polypropylene resin composition of the present invention is 20 to 100 kJ/m$^2$, preferably 25 to 60 kJ/m$^2$, and more preferably 30 to 50 kJ/m$^2$.

If the IZOD impact strength of the polypropylene resin composition is less than 20 kJ/m², a resulting molded article may have an insufficient impact strength.

The polypropylene resin composition of the present invention may contain additives such as antioxidants, UV absorbers, pigments, antistatic agents, copper inhibitors, flame retardants, neutralizing agents, foaming agents, plasticizers, nucleating agents, antifoaming agents and crosslinking agents.

The injection molded article of the present invention is one which is obtained by injection molding the polypropylene resin composition of the present invention. It is superior in heat distortion resistance, hardness and balance between rigidity and hot impact resistance.

Examples of the application of the injection molded article of the present invention include automotive parts, parts for electric or electronic appliances and parts of construction materials. The injection molded article is preferably applied for automotive parts, especially, bumpers, instrument panels and door trims.

EXAMPLES

The present invention is described by way of Examples and Comparative Examples. The invention, however, is not restricted to the Examples.

The methods for determining the characteristic values employed in Examples and Comparative Examples are shown below.

(1) Melt Flow Rate (MFR, g/10 min)

The melt flow rate was measured by the method provided in JIS K 6758. Unless otherwise stated, the measurement was conducted at a temperature of 230° C. and under a load of 2.16 kgf.

(2) Flexural Modulus (MPa)

The flexural modulus was measured by the method provided in ASTM D790. In the measurement used was a 3.2 mm thick specimen prepared by injection molding. The measuring conditions are as follows: span length: 50 mm; load speed: 2 mm/min; and measuring temperature: 23° C.

(3) Izod Impact Strength (IZOD, kJ/m²)

The IZOD impact strength was measured by the method provided in ASTM D256. In the measurement used was a 3.2 mm thick, notched specimen prepared by injection molding followed by notching. The measuring temperature was 23° C. and −30° C.

(4) Ethylene Content (% by Weight)

The ethylene content was determined by a calibration curve method using the absorbances of the characteristic absorptions assigned to a methyl group (—$CH_3$) and a methylene group (—$CH_2$—) in an infrared spectrum obtained by measuring the infrared spectrum of a press sheet of the material to be measured.

(5) Intrinsic Viscosity ([η], dl/g)

Reduced viscosities were measured at three points of concentrations of 0.1, 0.2 and 0.5 g/dl using a Ubbelohde's viscometer. Intrinsic viscosity was calculated by a calculation method described on page 491 in "Kobunshi Yoeki (Polymer Solution), Kobunshi Jikkengaku (Polymer Experiment Study) 11" (published by Kyoritsu Shuppan K.K., 1982), namely, by an extrapolation method in which reduced viscosities are plotted against concentrations and the concentration is extrapolated in zero. For polypropylene, the intrinsic viscosity was measured at a temperature of 135° C. using tetralin as a solvent.

(6) Weight Ratio of Propylene-ethylene Random Copolymer Portion in Propylene-ethylene Block Copolymer (X, % by Weight)

The weight ratio of the propylene-ethylene random copolymer portion in a propylene-ethylene block copolymer (X, % by weight) was calculated from the following formula using the crystal fusion heats of the propylene homopolymer portion and the whole block copolymer. The crystal fusion heat was measured by differential scanning calorimeter (DSC).

$$X = 1 - (\Delta Hf)_T/(\Delta Hf)_P$$

$(\Delta Hf)_T$: Fusion heat of the whole block copolymer (cal/g)
$(\Delta Hf)_P$: Fusion heat of the propylene homopolymer portion (cal/g)

(7) Ethylene Content of Propylene-ethylene Random Copolymer Portion in Propylene-ethylene Block Copolymer (% by Weight)

The ethylene content (% by weight) of the propylene-ethylene random copolymer portion in a propylene-ethylene block copolymer was calculated from the following formula using the ethylene content (% by weight) in the whole block copolymer measured by infrared absorption spectrometry.

$$(C2')_{EP} = (C2')_T/X$$

$(C2')_T$: Ethylene content (% by weight) of the whole block copolymer
$(C2')_{EP}$: Ethylene content (% by weight) of the ethylene-propylene random copolymer portion (8) Intrinsic Viscosity of Propylene-ethylene Random Copolymer Portion in Propylene-ethylene Block Copolymer ($[\eta]_{EP}$, dl/g)

The intrinsic viscosity ($[\eta]_{EP}$, dl/g) of propylene-ethylene random copolymer portion in a propylene-ethylene block copolymer was calculated from the following formula using the intrinsic viscosities of the propylene homopolymer portion and the whole block copolymer measured.

$$[\eta]_{EP} = [\eta]_T/X - (1/X - 1)[\eta]_P$$

$[\eta]_P$: Intrinsic viscosity (dl/g) of propylene homopolymer portion
$[\eta]_T$: Intrinsic viscosity (dl/g) of the whole block copolymer When a propylene-ethylene block copolymer was carried out, just after a propylene homopolymer, which would become the propylene homopolymer portion of the block copolymer, part of the propylene homopolymer was pulled out from the polymerization vessel. The intrinsic viscosity $[\eta]_P$ of the propylene homopolymer pulled out was measured and the data was used as the intrinsic viscosity of the propylene homopolymer portion.

(9) Heat Distortion Temperature (HDT, ° C.)

The heat distortion temperature was measured by the method provided in ASTM D648. A load of 0.45 MPa was used. The higher the heat distortion temperature, the better the heat distortion resistance.

(10) Rockwell Hardness (HR)

The Rockwell hardness was measured by the method provided in ASTM D785. The values measured are expressed in R scale.

Example 1 and Comparative Examples 1, 2 and 3

(Sample)
(A) Propylene-ethylene Block Copolymer
(1) Propylene-ethylene Block Copolymer (P-1)

Mitsui Sumitomo Polypropylene J60AP (commercial name) manufactured by Sumitomo Mitsui Polyolefin Co., Ltd. was used.

It had an MFR, measured at 230° C. under a load of 2.16 kgf, of 115 g/10 min.

The intrinsic viscosity ($[\eta]_{EP}$) of the propylene-ethylene random copolymer portion was 3.7 dl/g. The propylene-ethylene random copolymer portion had a weight ratio to the propylene-ethylene block copolymer (P1) of 10.0% by weight and an ethylene content of 40.0% by weight. The ethylene content of the propylene-ethylene block copolymer (P1) was 6.0% by weight.

(2) Propylene-ethylene Copolymer (P2)

Mitsui Sumitomo Polypropylene J739C (commercial name) manufactured by Sumitomo Mitsui Polyolefin Co., Ltd. was used.

It had an MFR, measured at 230° C. under a load of 2.16 kgf, of 86 g/10 min.

The intrinsic viscosity ($[\eta]_{EP}$) of the propylene-ethylene random copolymer portion was 5.5 dl/g. The propylene-ethylene random copolymer portion had a weight ratio to the propylene-ethylene block copolymer (P2) of 10% by weight and an ethylene content of 31% by weight. The ethylene content of the propylene-ethylene block copolymer (P2) was 4.1% by weight.

(3) Propylene-ethylene Copolymer (P3)

Mitsui Sumitomo Polypropylene J739 (commercial name) manufactured by Sumitomo Mitsui Polyolefin Co., Ltd. was used.

It had an MFR, measured at 230° C. under a load of 2.16 kgf, of 54 g/10 min.

The intrinsic viscosity ($[\eta]_{EP}$) of the propylene-ethylene random copolymer portion was 6.6 dl/g. The propylene-ethylene random copolymer portion had a weight ratio to the propylene-ethylene block copolymer (P3) of 10% by weight and an ethylene content of 29% by weight. The ethylene content of the propylene-ethylene block copolymer (P3) was 4.1% by weight.

(B) Ethylene-α-olefin Copolymer Rubber (R1)

As an ethylene-α-olefin copolymer rubber, TAFMER A6050 (commercial name) manufactured by Mitsui Chemicals, Inc. was used. It had an MFR, measured at 190° C. under a load of 2.16 kgf, of 6 g/10 min.

(C) Inorganic Filler (T1)

As inorganic filler, talc (commercial name: Hi-Filler 5000PJT7, manufactured by Matsumura Industries, Ltd.) was used.

(D) Organic Peroxide (PO1)

As an organic peroxide, PERHEXA 25B manufactured by NOF Corporation (2,5-dimethyl-2,5-bis(t-butylperoxy) hexane) was used.

Example 1

(Production of Polypropylene Resin Composition)

A blend was prepared by adding 0.016 part by weight of organic peroxide (PO1) to 100 parts by weight of a mixture containing 69% by weight of propylene-ethylene block copolymer (P1), 21% by weight of ethylene-α-olefin copolymer rubber (R1) and 10% by weight of talc (T1). This blend was charged into a twin screw extruder (TEX30α manufactured by The Japan Steel Works, LTD.). A propylene resin composition was prepared by kneading the blend while venting through a vent at a cylinder temperature of 250° C., an extrusion rate of 50 kg/hr and a screw rotation speed of 550 rpm. The resulting polypropylene resin composition had an MFR of 86 g/10 min.

(Production of Injection Molded Article)

A specimen for physical property evaluation was prepared under the following injection molding condition. The polypropylene resin composition obtained above was injection molded at a molding temperature of 180° C., a mold cooling temperature of 40° C., an injection time of 20 seconds and a cooling time of 25 seconds by use of an injection molding machine, model NN220α manufactured by Niigata Engineering Co., Ltd. The resulting injection molded article was measured for its physical properties and the results are shown in Table 1.

Comparative Example 1

A polypropylene resin composition and its injection molded article were prepared in the same manners as those in Example 1 except changing propylene-ethylene block copolymer (P1) to propylene-ethylene block copolymer (P2) and also changing the incorporation amount of organic peroxide (PO1) to 0.045 part by weight. The polypropylene resin composition had an MFR, measured at 230° C. under a load of 2.16 kgf, of 74 g/10 min. The resulting injection molded article was measured for its physical properties and the results are shown in Table 1.

Comparative Example 2

A polypropylene resin composition and its injection molded article were prepared in the same manners as those in Example 1 except changing propylene-ethylene block copolymer (P1) to propylene-ethylene block copolymer (P3) and also changing the incorporation amount of organic peroxide (PO) to 0.08 part by weight. The polypropylene resin composition had an MFR, measured at 230° C. under a load of 2.16 kgf, of 78 g/10 min. The resulting injection molded article was measured for its physical properties and the results are shown in Table 1.

Comparative Example 3

A polypropylene resin composition and its injection molded article were prepared in the same manners as those in Example 1 except using 76% by weight of propylene-ethylene block copolymer (P1), 14% by weight of ethylene-α-olefin copolymer rubber (R1) and 10% by weight of talc (T1) and also using no organic peroxide. The polypropylene resin composition had an MFR, measured at 230° C. under a load of 2.16 kgf, of 82 g/10 min. The resulting injection molded article was measured for its physical properties and the results are shown in Table 1.

TABLE 1

| | MFR (g/10 min) | Flexural modulus (MPa) | IZOD (KJ/m$^2$) | HDT (° C.) | Rockwell hardness (HR) |
|---|---|---|---|---|---|
| Example 1 | 86 | 1520 | 40 | 131 | 56 |
| Comparative Example 1 | 74 | 1161 | 40 | 119 | 53 |
| Comparative Example 2 | 78 | 1109 | 17 | 111 | 50 |
| Comparative Example 3 | 82 | 1664 | 10 | 124 | 72 |

The polypropylene resin composition of Example 1 which satisfies the requirements of the present invention is one obtained by use of a small amount of organic peroxide. That is of a low fluidity and also is superior in heat distortion resistance, hardness and balance between rigidity and impact strength.

In contrast, the injection molded article obtained from the polypropylene resin composition of Comparative Example 1 which does not satisfy the requirement about the melt flow rate of a propylene-ethylene block copolymer and the requirement about the intrinsic viscosity of the propylene-ethylene random copolymer is insufficient in rigidity and heat distortion resistance. Comparative Example 2 are insufficient in rigidity and impact strength are insufficient. Comparative Example 3 using no organic peroxide is insufficient in impact strength.

As described in detail above, a polypropylene resin composition characterized by being obtained by use of a small amount of organic peroxide, exhibiting a high fluidity, and being capable of yielding therefrom an injection molded article superior in heat distortion resistance, hardness and balance between rigidity and impact strength can be obtained according to the present invention. Moreover, by using this resin composition, an injection molded article which is superior in heat distortion resistance, hardness and balance between rigidity and impact strength can be obtained.

What is claimed is:

1. A polypropylene resin composition having a melt flow rate, measured at 230° C. under a load of 2.16 kgf, of 70 to 120 g/10 min, a flexural modulus of 1300 to 4000 MPa and an IZOD impact strength of 30 to 100 kJ/m$^2$, wherein the composition is obtained by adding 0.01 to 0.04 part by weight of an organic peroxide (D) to 100 parts by weight of a mixture comprising 60 to 80% by weight of a propylene-ethylene block copolymer (A) which is made up of a propylene homopolymer portion and a propylene-ethylene random copolymer portion and which satisfies requirements (A-1) through (A-5) defined below, 10 to 30% by weight of a rubber (B) which is a copolymer made up of ethylene and at least one α-olefin selected from the group consisting of 1-butene, 1-hexene and 1-octene and which has a melt flow rate, measured at 190° C. under a load of 2.16 kgf, of 2 to 10 g/10 min, and 5 to 20 parts by weight of inorganic filler (C), and kneading the combined ingredients at a temperature of 170 to 280° C., provided that each of the quantities of the propylene-ethylene block copolymer (A), the rubber (B) and the inorganic filler (C) is based on the total weight of these three ingredients:

requirement (A-1): the propylene-ethylene block copolymer has a melt flow rate, measured at 230° C. under a load of 2.16 kgf, of 100 to 140 g/10 min;

requirement (A-2): the propylene-ethylene random copolymer portion has an intrinsic viscosity of 3 to 5 dl/g;

requirement (A-3): the propylene-ethylene random copolymer portion has an ethylene content of 20 to 60% by weight;

requirement (A-4): the content of the propylene-ethylene random copolymer portion is 5 to 15% by weight; and requirement (A-5): the ethylene content of the propylene-ethylene block copolymer is 3 to 6.5% by weight.

2. A method for producing a polypropylene resin composition having a melt flow rate, measured at 230° C. under a load of 2.16 kgf, of 70 to 120 g/10 min, a flexural modulus of 1300 to 4000 MPa and an IZOD impact strength of 30 to 100 kJ/m$^2$, wherein the method comprises adding 0.01 to 0.04 part by weight of an organic peroxide (D) to 100 parts by weight of a mixture comprising 60 to 80% by weight of a propylene-ethylene block copolymer (A) which is made up of a propylene homopolymer portion and a propylene-ethylene random copolymer portion and which satisfies requirements (A-1) through (A-5) defined below, 10 to 30% by weight of a rubber (B) which is a copolymer made up of ethylene and at least one α-olefin selected from the group consisting of 1-butene, 1-hexene and 1-octene and which has a melt flow rate, measured at 190° C. under a load of 2.16 kgf, of 2 to 10 g/10 min, and 5 to 20 parts by weight of inorganic filler (C), and kneading the combined ingredients at a temperature of 170 to 280° C. to form a polypropylene resin composition, provided that each of the quantities of the propylene-ethylene block copolymer (A), the rubber (B) and the inorganic filler (C) is based on the total weight of these three ingredients:

requirement (A-1): the propylene-ethylene block copolymer has a melt flow rate, measured at 230° C. under a load of 2.16 kgf, of 100 to 140 g/10 min;

requirement (A-2): the propylene-ethylene random copolymer portion has an intrinsic viscosity of 3 to 5 dl/g;

requirement (A-3): the propylene-ethylene random copolymer portion has an ethylene content of 20 to 60% by weight;

requirement (A-4): the content of the propylene-ethylene random copolymer portion is 5 to 15% by weight; and requirement (A-5): the ethylene content of the propylene-ethylene block copolymer is 3 to 6.5% by weight.

3. An injection molded article obtained by injection molding the polypropylene resin composition according to claim 1.

* * * * *